INVENTORS
Miles Davies
Fred Neth
BY
Atty.

April 19, 1955

M. DAVIES ET AL 2,706,322

METHOD OF MAKING CONCRETE BLOCKS

Original Filed Dec. 6, 1948

INVENTORS

BY Miles Davies
Fred Neth

Atty.

April 19, 1955

M. DAVIES ET AL 2,706,322

METHOD OF MAKING CONCRETE BLOCKS

Original Filed Dec. 6, 1948

INVENTORS
Miles Davies
Fred Neth
BY
Atty.

April 19, 1955    M. DAVIES ET AL    2,706,322
METHOD OF MAKING CONCRETE BLOCKS
Original Filed Dec. 6, 1948    6 Sheets-Sheet 5

INVENTORS
Miles Davies
Fred Neth
BY
Atty.

April 19, 1955 M. DAVIES ET AL 2,706,322
METHOD OF MAKING CONCRETE BLOCKS
Original Filed Dec. 6, 1948 6 Sheets-Sheet 6
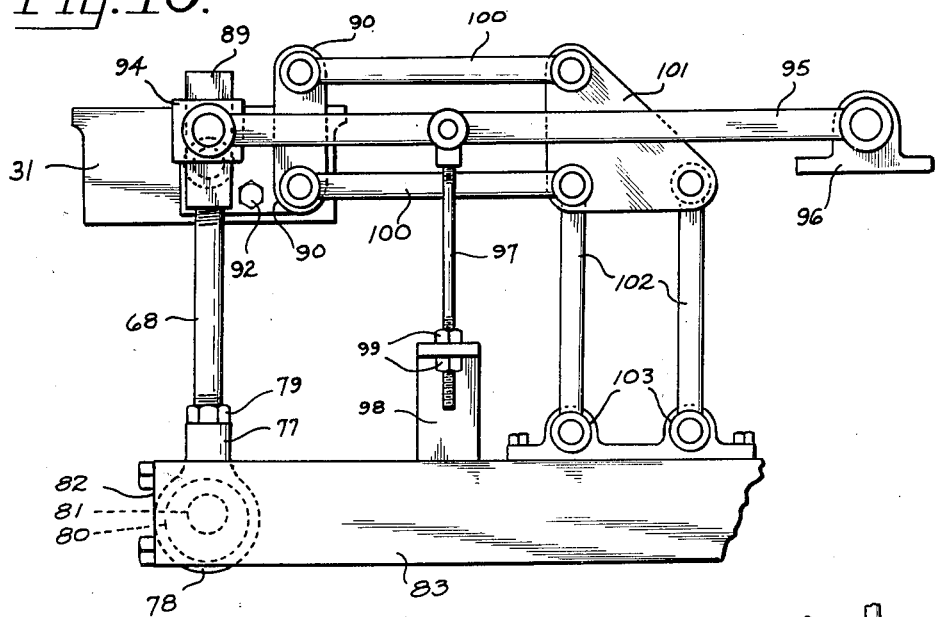
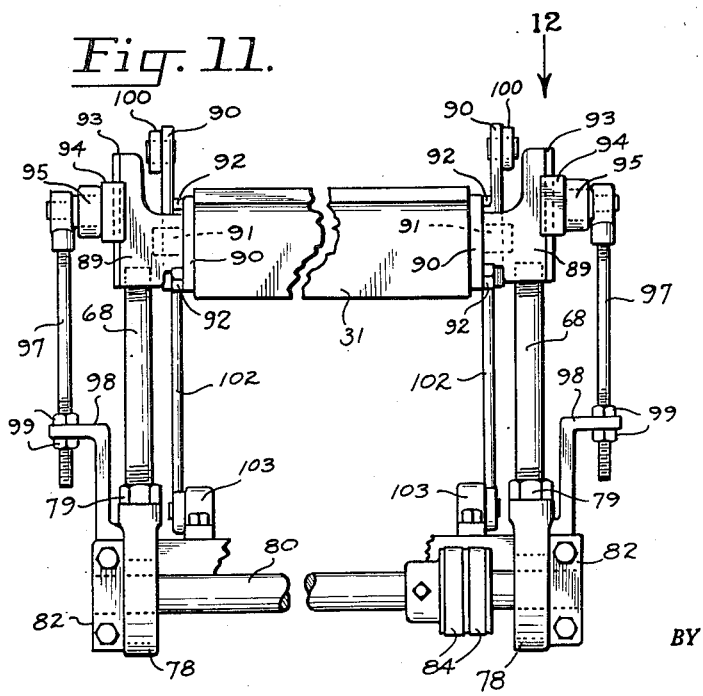
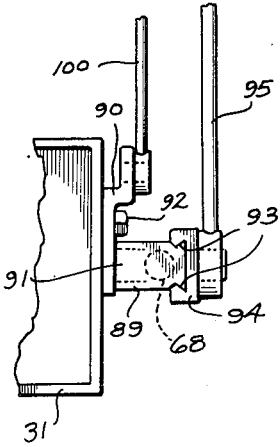
INVENTORS
Miles Davies
Fred Neth

United States Patent Office 2,706,322
Patented Apr. 19, 1955

2,706,322

METHOD OF MAKING CONCRETE BLOCKS

Miles Davies and Fred Neth, Vancouver, Wash., assignors to Fred Neth, doing business as Columbia Machine Works, Vancouver, Wash.

Original application December 6, 1948, Serial No. 63,812. Divided and this application May 5, 1951, Serial No. 224,772

4 Claims. (Cl. 25—155)

Our present invention is a division of a parent case now Patent Number 2,589,115. It pertains to a novel method in which controlled vibration and compression are utilized to produce concrete blocks of uniform density and superior strength.

One object of our invention is the provision of a method for making concrete blocks in which cushioning is provided to prevent sudden shock and consequent fracture of the molded blocks during ejection.

A further object of our invention is to provide complete ejection of blocks from the mold during vibration of the latter. Vibration of the mold during ejection of the blocks provides a troweling action upon the surfaces of said blocks whereby a smoother finish is obtained.

A still further object is the provision of a novel method in which controlled vibration and compression are utilized to produce concrete blocks of superior construction.

These and other objects and advantages of our invention will appear from the following detailed description taken in connection with the accompanying drawings of a typical machine which may be used to practice our invention and in which:

Fig. 10 is a fragmentary side elevation of a modified form of vibrator mechanism adapted for use in the machine shown in Fig. 1 in accordance with our invention;

Figure 1:
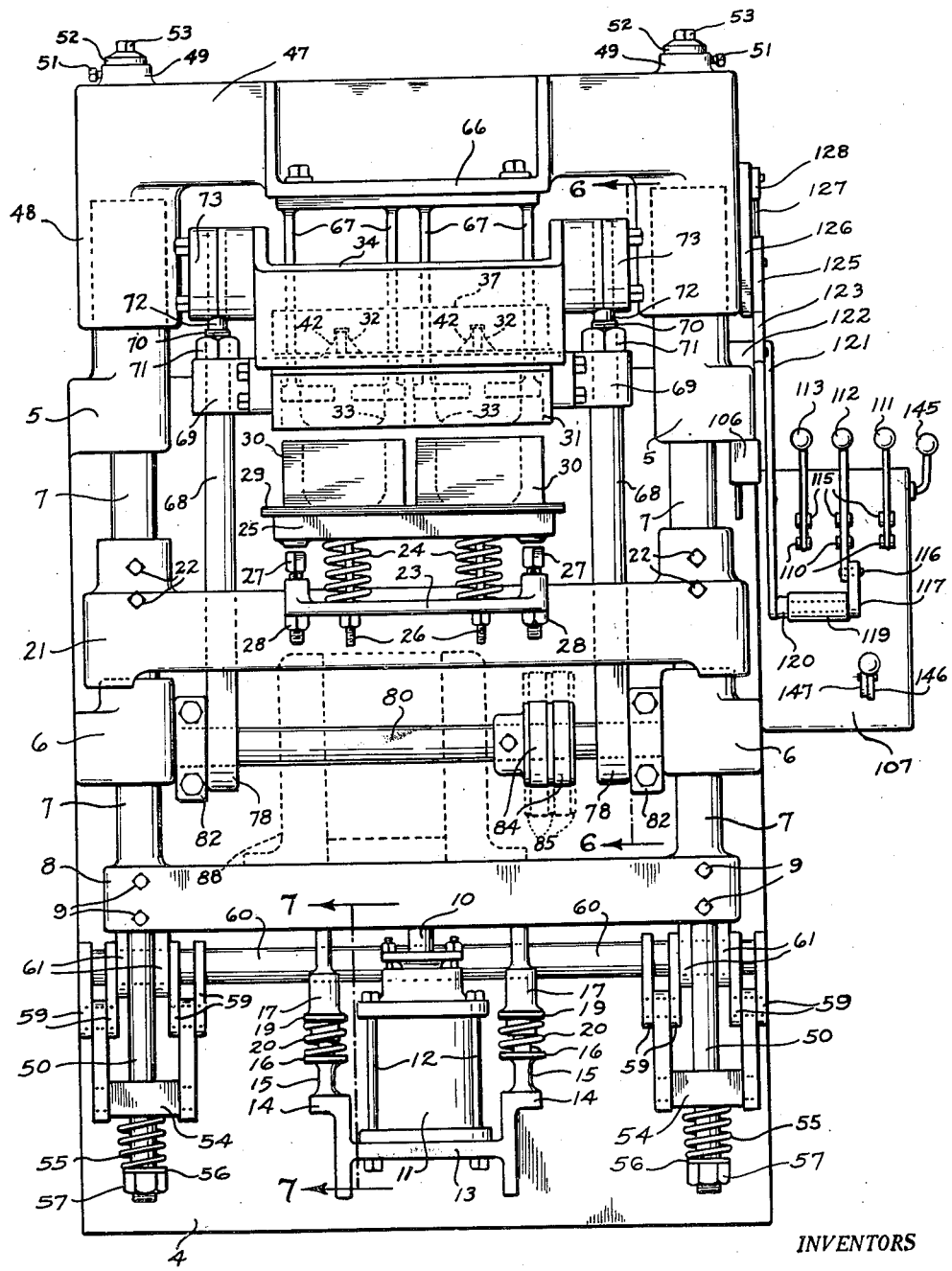
Fig. 1 is a front elevation of the said typical concrete block making machine, the parts thereof being shown in a position attained shortly after ejection of blocks from the mold.

Fig. 11 is an end elevation of said modification as viewed from the left in Fig. 10; and Fig. 12 is a fragmentary plan view as viewed in the direction of arrow 12 in Fig. 11, showing details of construction of the adjustment means by which the controlled vibration of the mold may be varied in amplitude and direction, the apparatus of these latter three figures being claimed in our copending application Ser. No. 224,771, filed May 5, 1951 and entitled Concrete Block Machine.

In the concrete block making machine embodying the features of our invention, the operating parts are mounted upon a rectangular frame which includes side panels 1, a top panel 2, a rear panel 3, and a front panel 4. Projecting forwardly from the lateral sides of the front panel are two pairs of base members, namely an upper pair 5 and a lower pair 6. Said base members have vertically aligned holes formed therein for receiving the tubular sleeves 7 slidably therein. The lower ends of said sleeves are joined together below the lower base members 6 by a horizontal toggle beam 8 which is secured to said sleeves by means of bolts 9. The toggle beam is supported at its center upon the upper end of a piston rod 10 which is secured thereto. The opposite end of the piston rod is connected to a piston which is movable vertically within a double acting hydraulic stripper cylinder 11. The stripper cylinder is secured by means of bolts 12 to an H-shaped bracket 13 which projects from the front panel 4 of the frame.

Figure 7:
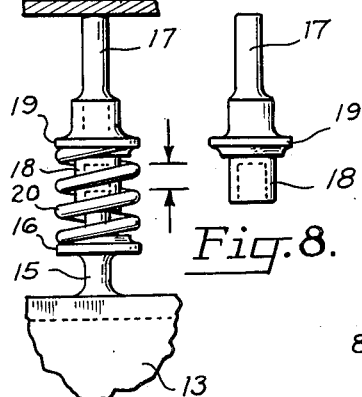
Fig. 7 is a fragmentary sectional view taken along the line 7—7 in Fig. 1 showing in detail the construction of the spring mounting for the ejector system, the magnitude of spring oscillation being indicated by vertically spaced lines identified by arrows.
Figure 8:
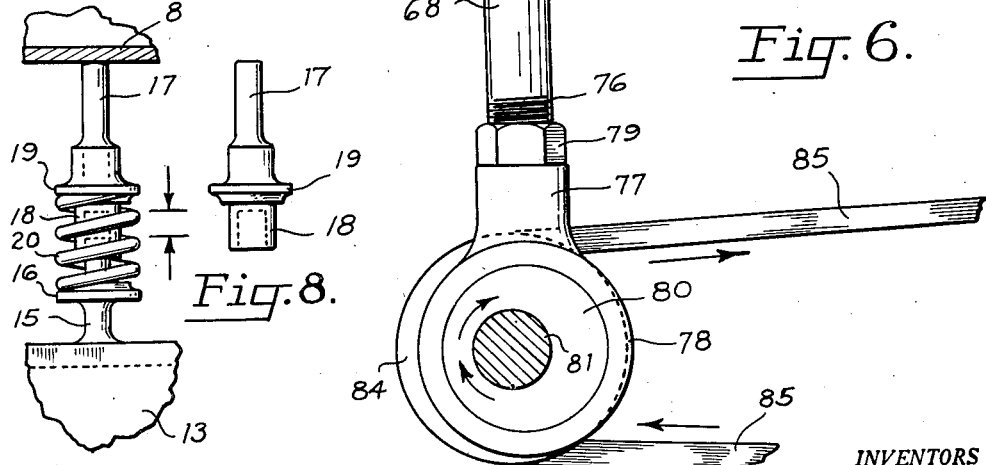
Fig. 8 is an elevation of the upper section of the spring mounting shown in Fig. 7.

The bracket 13 is formed with laterally projecting flanges 14 on its upper edge to provide supports for the upstanding pedestals 15 which are secured thereto. A shoulder 16 is formed about each of said pedestals intermediate the ends thereof. Removable bumpers 17 each have a hollowed end 18 which slidably engages the upper end of the pedestals. A shoulder 19 is formed intermediate the ends of said bumpers. Coil springs 20 encircle the engaged portions of said pedestals and bumpers and abut at their ends against the opposing faces of said shoulders. In the relaxed position of said springs, the telescoping ends of the pedestals and bumpers are spaced apart as indicated by the vertically spaced lines and arrows in Fig. 7 and may be moved together by compressing the coil springs 20. The upper ends of the bumpers are arranged to contact the toggle beam as the latter approaches its lowermost position, as is explained more fully hereinafter.

A pallet beam 21 extends transversely between the sleeves 7 intermediate the upper and lower base members 5 and 6, respectively, and is secured thereto by means of bolts 22. Since the toggle beam 8 and pallet beam 21 are secured firmly to the sleeves 7, the unit so formed is hereinafter referred to as the stripper assembly. A platform 23 projects forwardly and rearwardly from the center of said beam. Coil springs 24 rest at their lower ends upon said platform and support at their upper ends a pallet table 25. Bolts 26 extend axially through said springs and slidably through holes provided in the platform and table to secure said springs in place. Adjustment screws 27 are mounted upon the platform 23 for vertical adjustment and are provided with lock nuts 28 for securing said screws in any position desired. The adjustment screws are arranged to contact the pallet table 25 to prevent excessive rocking of the latter during vibration, as is explained in detail hereinafter. The pallet table is proportioned and arranged to support a pallet 29 upon which the concrete blocks 30 are carried from the machine after manufacture.

A concrete block mold 31 is held suspended above the pallet table 25 by vibrator means described hereinafter. Said mold comprises a rectangular box open at the top and bottom. The mold is of conventional construction and may be designed to accommodate the production of any type of block desired. The multiple mold illustrated in the drawings is designed for the manufacture of two hollow building blocks per cycle and is shown merely for purposes of illustration. Bars 32 are secured across the upper edge of the mold and serve as supports for the cores 33 which depend into the mold and define the inner margins of the hollow blocks.

Mounted above the top panel 2 and extending centrally thereof from front to rear is an elongated box-like housing 34 open at its top and bottom. Said housing is secured at its lower edges to a plate 35 attached to the top panel 2 and in this respect forms an integral part of the frame. The forward end of the housing overlies the mold 31 in spaced relation thereto. The forward end wall of said housing is of reduced height to permit visual inspection of the top of the mold. A hopper 36 is mounted removably upon lugs projecting inwardly of the sides of the housing and serves to store the concrete mixture which is to be molded into blocks. The hopper is open at its top and bottom, the latter communicating with a carrier box 37 which, in retracted position, rests upon the plate 35. Said carrier box comprises a rectangular frame having side walls 38, a rear end wall 39, and a partial front wall 40. A gate 41 is mounted slidably upon the partial front wall for vertical movement relative thereto, thus affording adjustment of the opening provided in said front end. Enlarged vertical slots 42 are formed in the gate, as shown in dotted outline in Fig. 1 of the drawings, to permit passage of said gate over the core securing bars 32 as the carrier box is moved over the top of the mold 31.

Extending rearwardly from the upper edge of the rear wall 39 of the carrier box is a horizontal plate 43 which rests slidably upon brackets 44 secured to the inner sides of the housing 34. Said plate functions to seal the bottom opening of the hopper 36 when the carrier box is drawn over the mold, thus preventing escape of concrete material from the hopper. A piston rod 45 is secured at its forward end to the rear wall 39 of the carrier box and at its opposite end to a piston which is mounted slidably in a hydraulic feed cylinder 46 secured at its rear end to the rear wall of the housing 34. Thus, fluid pressure impressed upon the piston moves the carrier box forward or rearward within the housing 34, depending upon the direction in which fluid flows in the double acting cylinder.

A pressure beam 47 overlies the forward end of the housing 34 and extends laterally across the frame above the sleeves 7. The ends of said pressure beam are formed with downwardly extending tubular shields 48 which loosely encompass the upwardly extending ends of the base members 5. Projecting collars 49 extend upwardly from the ends of the pressure beam and holes are formed vertically therethrough for axial alignment with the holes extending through the sleeves 7. Toggle rods 50 extend vertically through said aligned holes and are secured to the pressure beam by means of set screws 51 provided in the collars 49. The upper end of each toggle rod is also provided with a large washer 52 which is held firmly against the top edge of the collar 49 by means of a nut 53 threaded to the end of said rod. Said washer and nut serve to aid the set screw 51 in pulling the pressure head downwardly during compression of the concrete material in the mold 31.

The lower ends of the toggle rods 50 extend slidably through transversely apertured bars 54. Coil springs 55 encircle said rods below the bars 54 and are secured thereon by means of washers 56 and nuts 57. The bars 54 may slide downwardly along the lower ends of the toggle rods by compressing the springs 55, but said bars are prevented from moving upwardly along the toggle rods away from said springs. The coil springs function to prevent sudden and excessive forces from being exerted upon the concrete material being compressed in the mold 31, as is explained in detail hereinafter. To the cylindrical ends of bars 54, the lower arms 58 of toggle joints are pivotally secured. The upper arms 59 of said toggle joints are connected pivotally at one of their ends to the lower arms 58, while the opposite ends are secured firmly to a transverse shaft 60. Said shaft is mounted for rotation in bearing flanges 61 projecting from the toggle beam 8. Also secured firmly at one end to the shaft 60 is a rocker arm 62. The opposite end of said rocker arm is pivotally secured to the outer end of a piston rod 63, the inner end of which is connected to a piston which operates slidably within the hydraulic toggle cylinder 64. The rearward end of the toggle cylinder is secured pivotally to a bracket arm 65 which is mounted firmly upon the toggle beam 8. Arms 59 and 62, which are joined positively through shaft 60, function as a bell crank to raise and lower the toggle rods 50 as hydraulic fluid is admitted alternately into opposite ends of the toggle cylinder 64.

Brackets 66 project forwardly and rearwardly from the lower central portion of the pressure beam 47 to provide a base upon which the pressure shoes 67 may be detachably mounted. These shoes are of conventional construction and are designed to accommodate the production of diverse types and styles of concrete blocks.

The shoes illustrated in the drawings for the purpose of describing our invention comprise a plurality of bars shaped in such manner as to surround the cores 33 and to close the spacing provided between the cores and the walls of the mold wherein is contained the concrete material to be molded.

Mechanism is provided for vibrating the mold 31 in order to distribute and compress the concrete material evenly therein and thereby produce concrete blocks of homogeneous and uniform construction. The mechanism illustrated in Figs. 1 to 6, inclusive, includes a pair of vertical vibrator rods 68 secured adjacent their upper ends to the lateral sides of the mold 31 by means of brackets 69. The portions of said rods which are engaged by the brackets are of reduced diameter and are provided with threads 70 at their upper ends. The lower ends of said reduced portions thus form shoulders against which the bottom edges of the brackets abut. A nut 71 is threaded upon the upper end of each reduced portion and is tightened against the upper edges of the brackets to secure the mold firmly to the rods 68.

The fulcrum sections 72 of said rods extend above the reduced portions and are of still further reduced diameter. These sections project upwardly through bearing cases 73 which are secured firmly to the lateral sides of the housing 34. The slots 74 in said casings, through which the fulcrum sections project, are larger than the diameter of the latter and thus permit lateral movement of said fulcrum sections therein. The interior of each bearing casing is of circular shape and receives a cylindrical sleeve 75 for rotation therein. The fulcrum section of each vibrator rod 68 also extends through holes in said sleeves, said holes being of substantially the same diameter as said sections. The sleeves and vibrator rods may thus oscillate without imparting movement or vibration to the housing 34.

Figure 2:
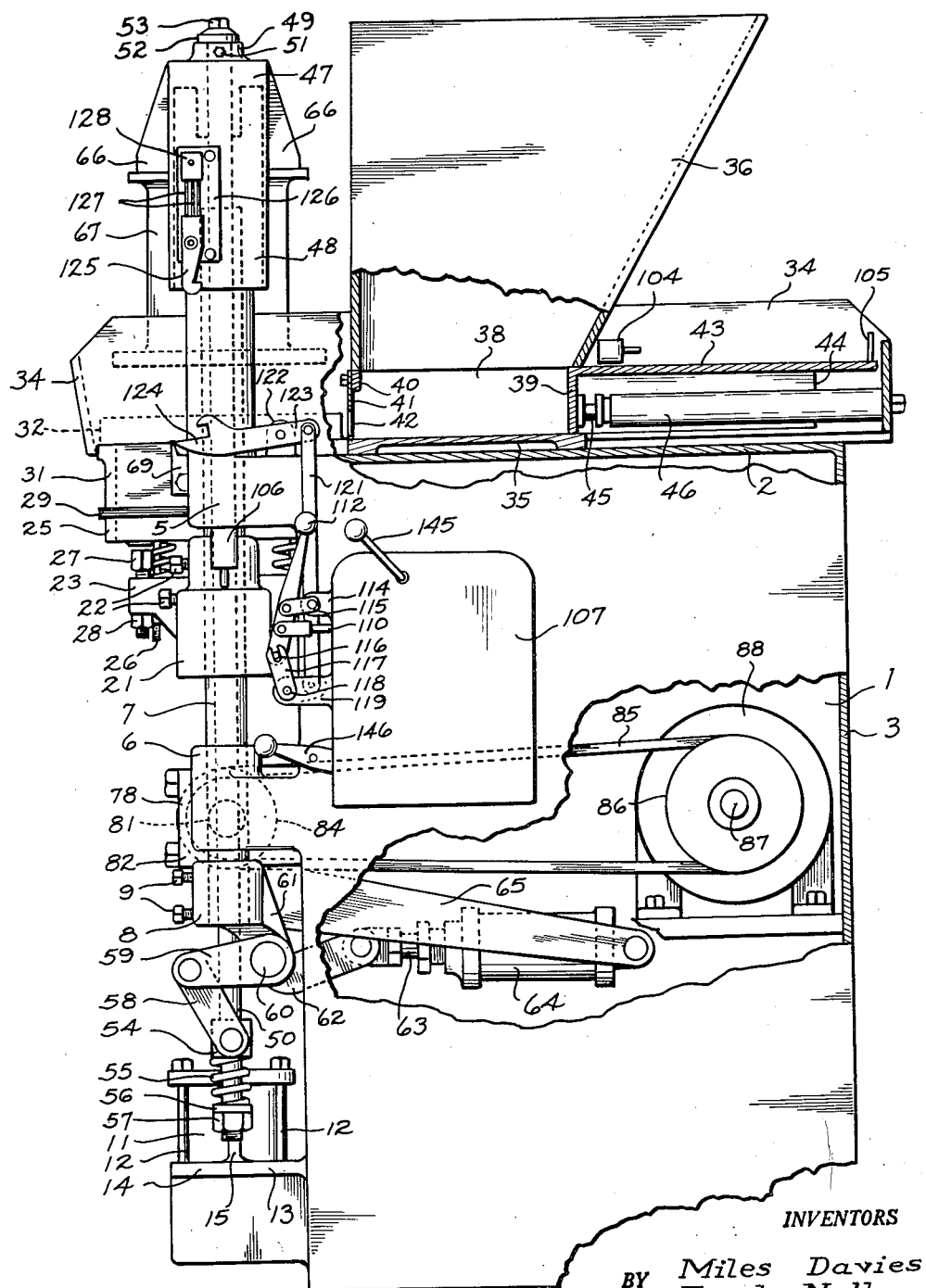
Fig. 2 is a fragmentary side elevation of the machine as viewed from the right in Fig. 1, the parts being shown in position ready for charging of the mold with premixed concrete material.

The lower end of each vibrator rod 68 is provided with threads 76 by which adjustable connection is made with the shank 77 of a bearing 78. A lock nut 79 engaging the threads 76 may be tightened against shank 77 to secure the vibrator rods in the position selected. The combination of adjustable nuts 71 and 79 affords means for varying the length of the vibrator rods whereby the upper edge of the mold 31 may be adjusted with respect to the lower level of the carrier box 37. A bushing 80 is mounted for rotation within the bearing 78 and is secured firmly in an off-center position to a driven shaft 81. Said driven shaft is mounted transversely across the front of the machine for rotation in end bearings 82 mounted on structural members 83 which are secured to the frame adjacent the lower base members 6. Drive pulley 84 is keyed to the driven shaft and receives drive belts 85 which are reeved over a similar pulley 86 mounted upon the drive shaft 87 of the motor 88, as best shown in Fig. 2 of the drawings.

The vibrator mechanism, as embodied in the structure illustrated in Figs. 10 to 12, inclusive, represents the preferred form of our invention. In this modification, each of the vibrator rods 68 are joined at their upper ends to vertical guides 89. Said guides are mounted pivotally on brackets 90 by means of pins 91 which project outwardly from said brackets into bearing holes provided in said guides. The brackets 90 are mounted firmly on opposite lateral sides of the mold 31 by means of bolts 92. Vertical V-shaped grooves 93 are formed in the sides of said guides to receive the complementary notched edges of the channel-shaped slide members 94 which are proportioned and arranged to move vertically over the guides 89. Adjustment bars 95 are secured pivotally at their forward ends to each slide member 94 and at their rearward ends to brackets 96 mounted upon the frame of the machine. Adjustment screws 97 are secured pivotally to the adjustment bars 95 intermediate the ends of the latter. These screws extend downwardly through flanged brackets 98 secured to the structural members 83. Adjustment nuts 99 are threaded upon said screws on opposite sides of the brackets 98 to provide convenient means for varying the vertical position of the slide members 94 upon the guides 89.

The rearward ends of brackets 90 are offset outwardly away from the sides of the mold 31. Spaced parallel links 100 are secured pivotally at one of their ends to said brackets and at their rearward ends to triangular plates 101. A second pair of spaced parallel links 102 are secured pivotally at one of their ends to said triangular plate 101 at right angles to the connections of links 100. The lower ends of links 102 are secured pivotally to brackets 103 mounted upon the structural member 83. The arrangement of parallel links 100 and 102, respectively, functions to prevent rotation of the mold 31 about a horizontal axis, as is explained more fully hereinafter. The lower ends of the vibrator rod 68 are joined to the driven shaft 80 through the eccentric cams as discussed hereinbefore in the description of the structure illustrated in Figs. 1 to 6, inclusive.

The operation of the electric vibrator motor 88 is controlled in either of the above discussed modifications by means of a magnetic switch (not shown) which is energized by toggle switch 104 located upon the inner wall of the housing 34. Said toggle switch is closed by a contact arm 105 mounted upon the plate 43 when the carrier box 37 moves forwardly over the mold. The switch 104 may be arranged at any point along the path of travel of the arm 105, it being preferred to arrange the switch at the point where said arm makes contact when the carrier box is superimposed over the mold. In this manner, vibration of the mold does not occur until the carrier box and the concrete material contained therein are disposed above the mold. The magnetic switch is de-energized by a second switch 106 which is secured to one of the upper base members 5 and depends downwardly for contact with the pallet beam 21 when the latter is in its uppermost position. In this position, the switch 106 completes the circuit through the magnetic switch and motor 88. However, when the pallet beam moves downwardly during the ejection of blocks 30 from the mold, switch 106 breaks said circuit and stops the vibrator motor 88, as is explained more fully hereinafter.

Mechanism is provided by which the sequential operation of the block making machine may be performed manually or automatically. Except for the operation of the vibrator motor 88, the remaining elements of the machine are operated preferably by means of three hydraulically actuated piston-and-cylinder units, namely the feed cylinder 46, the stripper cylinder 11 and the toggle cylinder 64. Each of these cylinder units is double acting; that is, fluid pressure is admitted alternately to opposite sides of the piston to move the latter in opposite directions within the cylinder. A control box 107 is mounted upon the side panel 1 and serves as a support and shield for the control mechanism. Mounted within said control box, upon the forward end thereof, are three hydraulic control valves 108, one of which is disposed in each of the hydraulic fluid lines intermediate the storage tank (not shown) and the separate piston-and-cylinder units described hereinbefore. Each control valve has two inlet ports (not shown) for connection with the fluid storage tank and two outlet ports 109 for connection with the corresponding piston-and-cylinder unit. A piston within each control valve may be moved with relation to said inlet and outlet ports in such manner as to cause fluid to flow from the storage tank into the selected cylinder unit on one or the other sides of the piston contained therein while fluid flows from the opposite side of the piston back to the storage tank. The neutral position of the control valve pistons prevent fluid flow in either direction between the storage tank and the piston-and-cylinder units. This type of control is well known in the art and therefore complete description thereof is considered unnecessary.

Piston rods 110, secured to one end of each of the control valve pistons, extend outwardly of the control box 108 and are each pivotally secured to the lower end of the hand levers 111, 112 and 113, respectively. Lever 111 actuates the control valve of the stripper cylinder 11, lever 112 actuates the control valve of the toggle cylinder 64, and lever 113 actuates the control valve of the feed cylinder 46. Each of said levers is pivotally secured to a bracket 114 projecting from each control valve to a link 115. The link connection to the levers is made at a point intermediate the handle end and the connection of the piston rods 100, as best shown in Fig. 9 of the drawings.

Lever 112 extends downwardly from the connection of the piston rod 110 and is provided at its end with a projecting pin 116. Said pin engages the slotted end of arm 117, which is attached firmly at the opposite end to a pin 118. Pin 118 is mounted for rotation in bracket 119, which is secured to the front panel of the control box 107. A second arm 120 is secured firmly at one end to pin 118 and at the opposite end it is joined pivotally to the lower end of link rod 121. The upper end of link rod 121 is pivotally connected to the rear end of a lever 123 which is mounted pivotally intermediate its ends upon a bracket 122 secured to a base member 5. The forward end 124 of lever 122 is notched transversely to form a latch. Said latch is proportioned and arranged to receive resiliently the hooked end of catch 125 which is secured pivotally intermediate its ends to a bracket 126. A plurality of tension springs 127 interconnect the upper end of the catch with a plate 128 secured pivotally to the bracket 126 for holding said catch resiliently in a vertical position. The bracket 126 is mounted for lateral adjustment upon the tubular shield 48, whereby the engagement of the catch and latch may be selectively controlled.

Figure 9:
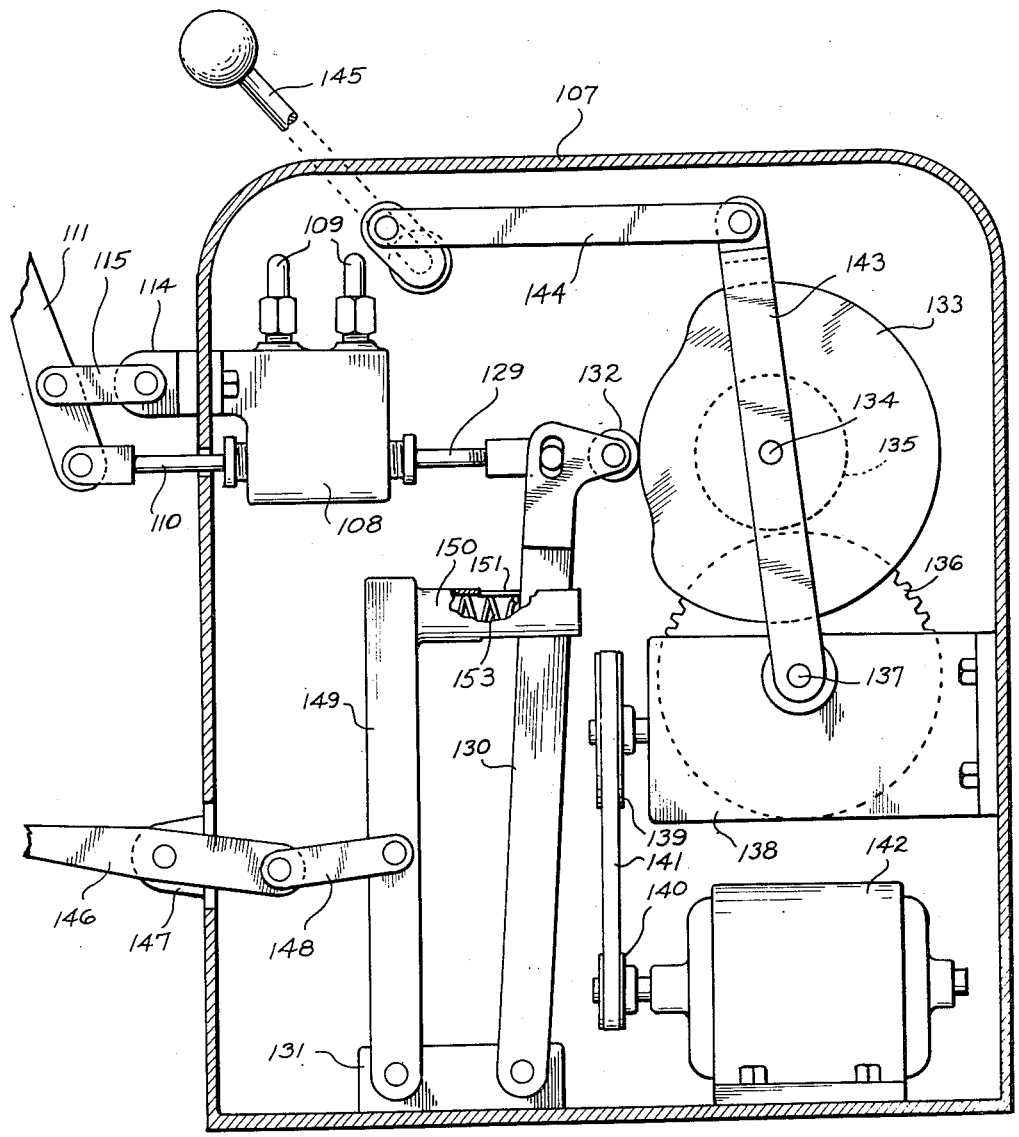
Fig. 9 is a fragmentary side elevation, partly in section, of the control mechanism of the machine illustrated in Fig. 1, showing the arrangement of parts for obtaining automatic or manual operation of said machine.

Referring now to Fig. 9 of the drawings, piston rods 129 are secured to the inner ends of the pistons of the control valves 108. The outer end of each of these piston rods 129 is pivotally secured to the upper ends of three lever arms 120 which are mounted pivotally at their lower ends on brackets 131 secured to the base of the control box 107. A rearwardly projecting flange at the upper end of each arm 130 supports on idler wheel 132, each of which is adapted to engage the peripheral surface of a cam wheel 133. The three cam wheels are mounted in spaced relation upon a shaft 134 which is driven by means of interengaging gears 135 and 136. Gear 136 is secured to the power take-off shaft 137 of a gear reduction unit 138 which is connected through pulleys 139 and 140 and belt 141 to the control drive motor 142.

The cams 133 which govern the automatic sequence of operation may be disengaged from the idler wheels 132 whenever manual operation of the levers 111, 112 and 113 is desirable. The levers 143 upon which the shaft 134 is journaled are mounted rotatably at their lower ends upon the ends of the power take-off shaft 137. The upper ends of said levers are connected through link 144 to a hand lever 145 intermediate the ends of the latter. Said hand lever 145 is mounted pivotally on the side of the control box 107 and projects outwardly therefrom for convenient manipulation. A second hand lever 146 is pivotally mounted intermediate its ends upon a bracket 147 extending from the front panel of the control box. Said lever 146 projects inwardly through a slot in the control box and is connected pivotally at its inner end through link 148 to lever 149. Lever 149 is pivotally mounted at its lower end to bracket 131 forwardly of the connection of lever arms 130. Lever 149 is provided at its upper end with three rearwardly projecting tubes 150. The rearward end of each of said tubes is provided with vertical slots 151, each arranged to receive one of the lever arms 130 therein. Coil springs 153 are disposed within the tubes between the levers 149 and the lever arms 130 and function to urge the latter rearwardly to provide positive contact between the idler wheels 132 and the cams 133. Thus, by rotating hand levers 145 and 146 in a clockwise direction, as viewed in Fig. 9, the levers 130 and the cams 133 are drawn apart and out of contact with each other, whereby operation of the block making machine is reduced to manual control.

The operation of the concrete block making machine described hereinbefore, which also exemplifies the method embodying our invention, is as follows:

Let it be assumed for purposes of explanation that the various elements of the machine are arranged in the position shown in Fig. 2 of the drawings. In this position, with the hydraulic fluid pump (not shown) and the control valve motor 142 in operation, the toggle beam 8, the pallet beam 21 and the pressure beam 47 are in their upwardmost position and springs 24 hold the pallet 29 resiliently against the bottom of the mold 31. The carrier box 37 is arranged below the supply hopper 36 and is thus filled with the concrete mixture to be formed into blocks. The types of blocks most common in the art and which are readily produced by our machine are those composed either of pumice stone or those of sand and other aggregate. Said concrete mixture contains sufficient water for producing the desired chemical reaction, but insufficient water to form a "wet" mix. In other words, the mixture is in the so-called "dry" state, in which considerable pressure is required to cause the particles to cohere. The mixture flows freely, therefore, and is capable of being admitted into the mold and vibrated and compressed quickly into block form.

In automatic operation, the cam 133 which actuates the control valve 108 of the feed cylinder 46 now moves to the position in which hydraulic fluid flows into the rearward end of the feed cylinder. The carrier box 37 thus moves forwardly and becomes superimposed over the mold 31 and the plate 43 closes the bottom of the supply hopper 36. Simultaneously therewith, contact arm 105 engages the toggle switch 104 which completes the circuit through the closed switch 106 and the magnetic switch (not shown) to energize the vibrator motor 88. In the type of vibrator construction illustrated in Figs. 1 to 6, inclusive, the carrier box 37, the mold 31, the pallet 29, and the pallet table 25 are caused to move through an elliptical path in the direction of movement of belts 85, as indicated by the arrows in Fig. 6. The adjustment screws 27 are set to provide a clearance between their upper ends and the bottom of the pallet table equal in magnitude to the vertical movement of the vibrator rods 68, as determined by the degree of offset of the driven shaft 81 from the center of the cam bushing 80. Ordinarily the rods 68 may bend or whip axially during their rapid movement and thereby cause greater tipping of the mold than normally should occur, but the setting of the screws 27 limits the magnitude of such tipping action to a constant value.

In the modified form of vibrator illustrated in Figs. 10 to 12, inclusive, the arrangement of parallel links 100 and 102 prevents the tipping action and permits motion of the mold only in vertical and horizontal planes. The magnitude and direction of the horizontal movement is made variable by adjusting the position of the slide members 94 relative to the pivot axis 91 of the mold. Thus, when the slide member is positioned above the pin 91, the mold rotates in a clockwise direction, as viewed in Fig. 10, while the direction is reversed when the slide member is situated below the pin. It is evident that only vertical motion results when the slide member 94 lies in coincidence with the pivot axis 91 of the mold. That is to say, when the slide member 94 and the pins 91 coincide (which pins define the mold box pivot axis), pure vertical motion is transmitted to the mold 31. On the other hand, if the slide members 94 are positioned above the pins 91 (as shown in Fig. 11), then the vibrator rods 68 will rotate or gyrate the lower ends of the vertical guides 89 and, hence, the pivot pins 91, in an elliptical or a circular path. Referring to Fig. 10, this gyration of the pivot pins 91, is imposed upon the mold box 31. However, because the parallel links 100 and 102 prevent tipping of the mold box 31, the elliptical or circular path through which the box is vibrated always will be traced with the sides of the box vertical and the top and bottom thereof horizontal. That is to say, the sides and the (planes of the) top and bottom of the mold, respectively, will remain in vertical and horizontal planes (no tipping) even through the mold itself travels in an elliptical or circular path. This novel type of vibration produces flow of the material in the mold (similar to the flow indicated by the arrows in Fig. 6) so as to provide a better block with a more dense surface yet, at the same time, ejection during vibration is accommodated (because the sides of the mold are maintained parallel to the direction of ejection movement) so that a troweled finish is obtained. Accordingly, such novel vibration is an important part of my invention.

The vibratory motion causes the dry concrete material to fall from the carrier box into the mold. It generally occurs that a majority of the concrete falls into the near side of the mold; that is, the side over which the carrier box first moves during its forward travel. The direction of the vibratory movement causes the concrete material thus arranged to move forwardly in the mold in the direction of the arrow shown in Fig. 6 to fill the latter to an even depth. Fluid now flows into the forward end of the feed cylinder 46 and causes the carrier box to be retracted. By proper setting of the gate 41, concrete material in excess of the quantity required to form the blocks is removed. It is to be noted that the vertical slots 42 which overlie the core bars 32 are enlarged to permit retention in the mold of a quantity of concrete material sufficient to fill the void produced immediately below said core bars. It may occur in the manufacture of some types of blocks that the quantity of concrete material carried by the box 37 is insufficient to fill said mold. In such cases, the cam 133 may be designed to permit a second full or partial load to be added to the mold.

Figure 3:
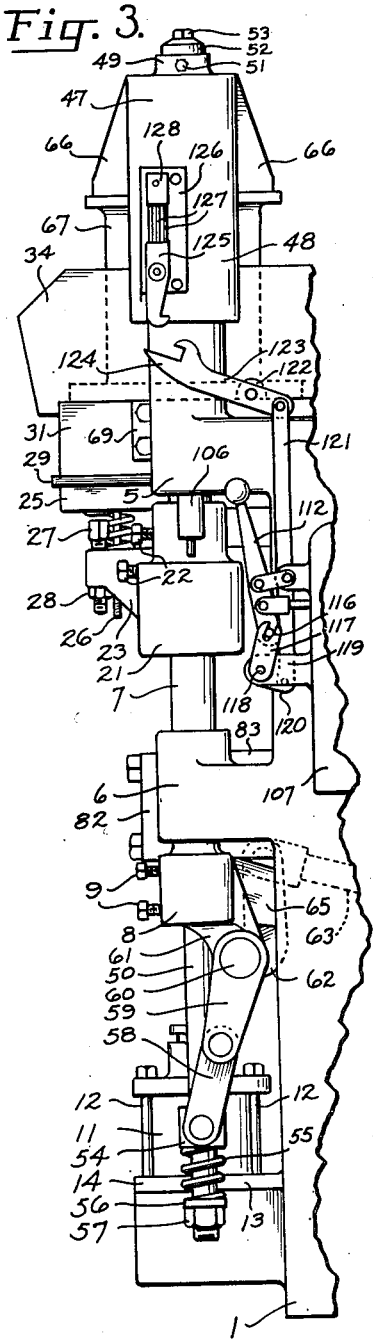
Fig. 3 is a fragmentary side elevation of the forward end of the machine illustrated in Fig. 1, the parts thereof being shown in the position attained after pressing of the concrete material in the mold and just prior to ejection therefrom.
Figure 4:
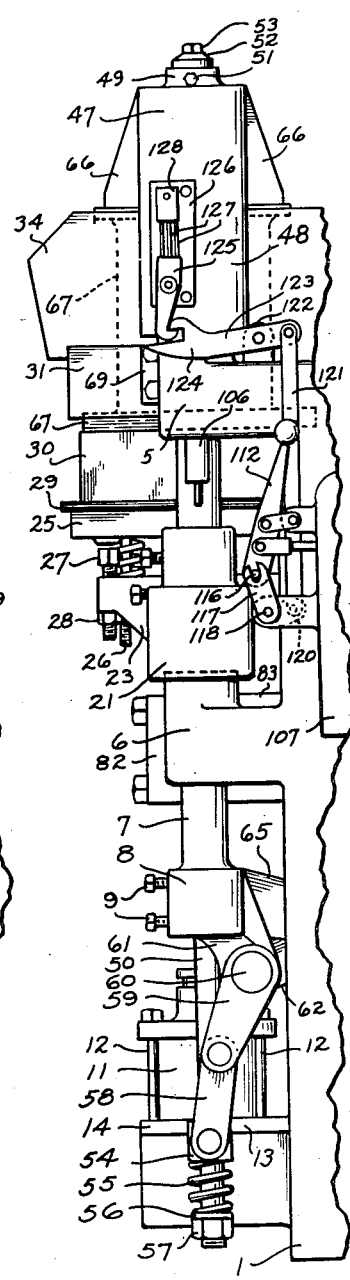
Fig. 4 is a fragmentary side elevation similar to Fig. 3 showing the parts of the machine in the position of complete ejection of the concrete blocks from the mold.

After the mold has been filled and the excess concrete material drawn off, the vibration is continued and fluid pressure is admitted into the rearward end of the toggle cylinder 64. The piston rod 63 moves outwardly, causing the arms 58 and 59 of the toggle joint to straighten out and thus move the pressure beam 47 and shoes 67 downwardly over the mold. Coil springs 55 function during this movement to prevent excessive pressure to be exerted by the shoes 67 upon the concrete material in the mold. The action desired is to have the vibratory motion cause most of the settling and uniform distribution of the concrete material and to supply sufficient pressure on the shoes to maintain a level surface and uniform pressure throughout the depth of the mold. When the toggle joint is fully straightened, as shown in Fig. 3 of the drawings, vibration continues to pack the concrete material until little, if any, pressure is exerted by the shoes 67 upon the compressed blocks in the mold. At this point the cam 133 operates the control valve 108 of the stripper cylinder 11, causing fluid to be admitted to the upper end of the latter. Piston rod 10 thereupon moves downwardly, pulling the toggle beam 8, the pallet beam 21, and the pressure beam 47 with it.

As the pallet beam 21 moves downwardly, the switch 106 opens and breaks the circuit to the vibrator motor 88. Said switch may be arranged to stop the vibration at any point along the downward movement of the pallet beam, in contrast with the requirement of prior machines that vibration must be stopped before ejection of the blocks from the mold is started. It has been found desirable in many instances of operation of the device herein described to continue vibration during full extraction of the blocks from the mold. In these cases, it has been observed that the troweling action of the vibrating mold against the sides of the blocks produces a smoother surface. Whereas in conventional machine extraction during vibration results in fracture of the blocks, the blocks produced by the machine described herein exhibit no structural deformities or weakness. Although the reasons for this difference are not completely understood, it is believed to result from the precise control of vibratory motion attainable with the present device.

Provision is made for cushioning the above assembly against shock as it reaches its lowermost position, thus preventing breaking of the blocks which rest freely upon the pallet 29. As the assembly reaches the position shown in Fig. 4, catch 125 contacts the notched end of lever 123 and pivots the latter in a counter-clockwise direction. Lever 112 thereupon moves rearwardly to change the flow of fluid through control valve 108 to the front end of the toggle cylinder 64. The arms 58 and 59 of the toggle joint thus move together slightly to raise the toggle rods 50 and pressure beam 47 whereby the pressure shoes 68 are elevated from the blocks 30. Simultaneously with the changing of flow of fluid in the toggle cylinder 64, the volume of hydraulic fluid previously admitted to the upper end of the stripper cylinder is reduced by one-half, the remaining one-half being fed to the toggle cylinder. The downward pull of the stripper cylinder piston is thereby reduced and the toggle beam 8 strikes the bumpers 17 with a diminished force. The bumpers 17 then move downwardly against the compression of the coil springs 20 into abutment with the pedestals 15, thereby bringing the assembly to a smooth halt.

Figure 5:
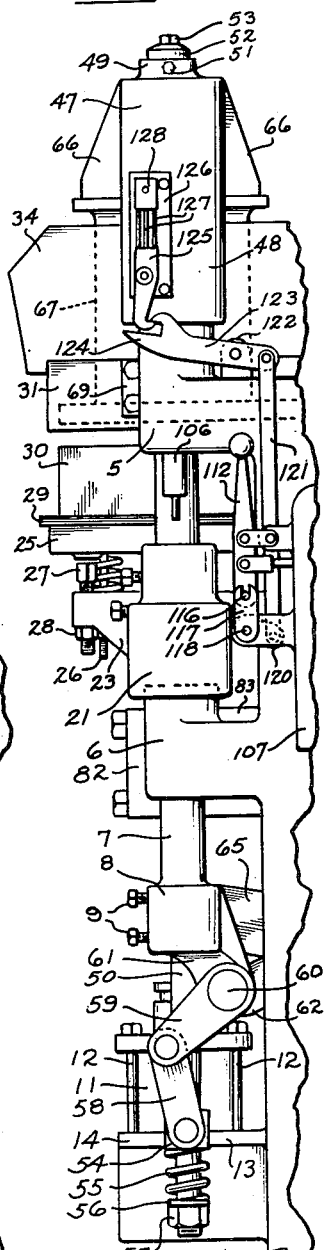
Fig. 5 is a fragmentary side elevation similar to Fig. 3 showing the parts of the machine in a position attained after ejection of the blocks from the mold and intermediate the positions illustrated in Figs. 4 and 1, respectively.
Figure 6:
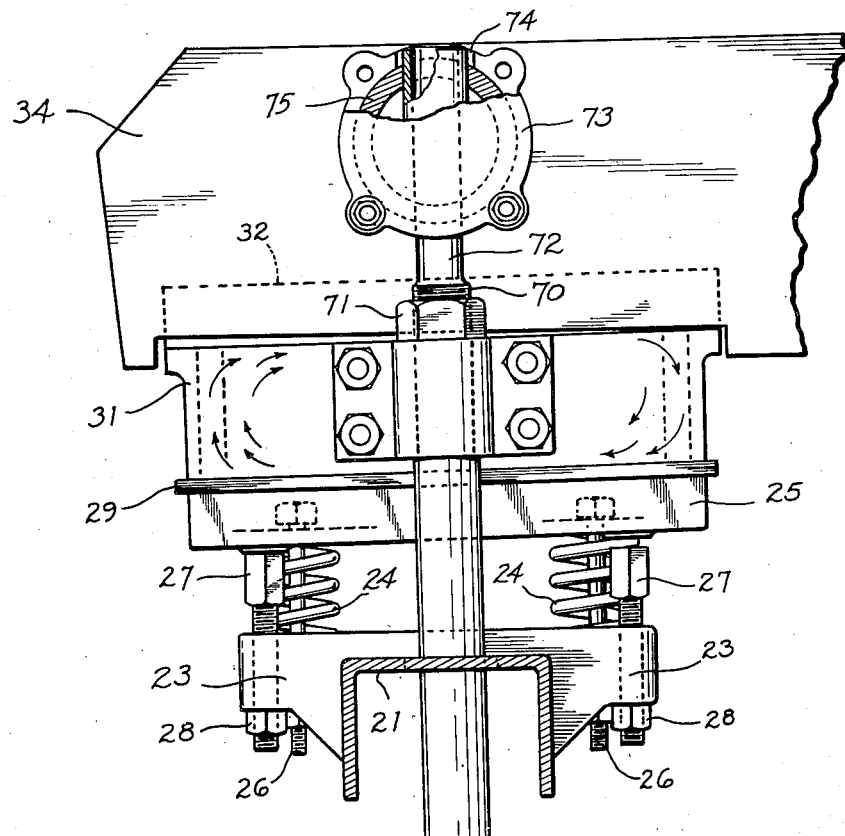
Fig. 6 is a fragmentary side elevation, partly in section, of the vibrator mechanism of the machine taken along the line 6—6 in Fig. 1, the direction of rotation of the cam drive and the resultant movement of the concrete material in the mold being indicated by arrows.

As hydraulic fluid was admitted to the front end of the toggle cylinder 64, as explained in the preceding paragraph, the toggle joint began to close and the pressure beam 47 started to move upwardly. Catch 125, which is mounted upon the side of the beam 47, therefore moved upwardly also. Since the catch is engaged with the notched end 125 of the lever 123, the latter is caused to pivot in a clockwise direction until the control valve lever 112 reaches its neutral position, as shown in Fig. 5 of the drawings. Fluid flow to the toggle cylinder 64 now ceases and the pressure beam 47 remains stationary. In this position the blocks 30 are ready for removal from the pallet table 25. This may be accomplished by removing the pallet 29 with the blocks resting thereon by hand. A preferred method, however, is to provide automatic means for feeding a new pallet onto the table 25 whereby the loaded pallet is pushed outwardly upon a conveyor which transports the formed blocks to a storage place where final curing is effected. Such automatic means forms no part of the present invention and is therefore not described in detail here.

After the blocks 30 and its supporting pallet 29 have been removed from the machine and a new pallet has been arranged upon the table 25, the cam 33 which operates the control valve 108 of the stripper cylinder 11 moves to the position at which hydraulic fluid flows into the bottom side of said stripper cylinder. This causes the toggle beam 8, the pallet beam 21, and the pressure beam 47 to rise upwardly through the position shown in Fig. 1 to the fully elevated position shown in Fig. 2. During rise of the pressure beam, catch 125 disengages from lever 123 without moving the latter, and hence without disturbing the neutral setting of hand lever 112. The cam 133 which operates the control valve of the toggle cylinder 64 now moves to admit hydraulic fluid into the forward end of the toggle cylinder. This causes the toggle joint to close and thus to move the toggle rods 50 upwardly to their fully extended position whereby the pressure shoes 67 are raised clear of the mold 31 and carrier box 37. The various elements of the machine have thus moved through one complete operating cycle and are returned to the position shown in Fig. 2.

Although the operation has been described herein with reference to the automatic sequence control system, it is evident that said operation may be performed manually by merely moving levers 145 and 146 to the positions wherein the cams 133 are operatively disconnected from the control valves 108. Manual control of the operating sequence is desirable, particularly in cases where inconsistencies occur in the texture of the concrete mixture. It frequently happens, for example, that the mixture deposited in supply hopper 36 contains an excess of water. Such a mixture exhibits reluctance to flow, and thus the mold is properly filled only after an extended period of vibration. On the automatic sequence, blocks prepared from the wet mixture become distorted and weak after ejection from the mold. It has been the practice heretofore to remove the wet mix from the hopper and discard it where changes in timing of the various molding steps were not obtainable. This practice is expensive, for not only are large quantities of material wasted, but considerable time is spent in clearing the hopper and mold and preparing a new mixture of proper consistency. The use of our machine, however, permits rapid change from automatic to manual control, and thus variations in mixtures are readily accommodated without waste or other additional expense.

We claim:

1. A method of making concrete blocks comprising providing a substantially dry mixture of concrete material, depositing a quantity of said material in a mold having vertical side walls, simultaneously applying a yielding pressure upon said material and vibrating said mold with an elliptical motion while retaining said side walls in a vertical disposition thereby to compact and distribute said material uniformly throughout said mold, continuing said elliptical vibration until the material is compacted to a point at which said yielding pressure thereon is relieved, and stripping the formed blocks from said mold while continuing said elliptical vibration and said side wall vertical disposition, whereby to effect a troweling action upon the surfaces of said blocks and to produce a smooth finish thereon.

2. A method of making concrete blocks comprising providing a substantially dry mixture of concrete material, depositing a quantity of said material in a mold having vertical side walls, simultaneously applying a yielding pressure upon said material and vibrating said mold to compact and to distribute said material uniformly throughout said mold, the magnitude of said vibration being maintained constant irrespective of the frequency thereof and being restricted to simultaneous horizontal and vertical movement, retaining the vertical disposition of said side walls during vibration, continuing said vibration until the material is compacted to a point at which said yielding pressure thereon is relieved, and stripping the formed blocks from said mold while continuing the vibration and the vertical disposition of the side walls, whereby to effect a troweling action upon the surfaces of said blocks and to produce a smooth finish thereon.

3. A method for making a concrete block, comprising providing a mold box having vertical side walls, depositing a quantity of concrete in said mold box, vibrating said mold both vertically and laterally, at the same time, while constraining said side walls to a continuous vertical disposition, and removing the formed concrete block from the mold box while continuing both the vibration and the vertical disposition of the side walls.

4. A method of making a concrete block, comprising arranging a rectangular mold box and a bottom pallet so the sides of the mold box are in a vertical plane and the pallet is in a horizontal plane, depositing a quantity of substantially dry mix concrete material in said mold box and upon said pallet, vibrating said mold box in a vertical and horizontal direction simultaneously while, at the same time, retaining the sides of the mold box vertical and the pallet horizontal, and stripping the formed block from said mold while continuing said vibration and while retaining the sides of the mold vertical.

References Cited in the file of this patent

UNITED STATES PATENTS

| 2,099,946 | Straub | Nov. 23, 1937 |
| 2,529,404 | Mays | Nov. 7, 1950 |
| 2,589,115 | Nelson et al. | Mar. 11, 1952 |